US005184389A

United States Patent [19]

Dean

[11] Patent Number: 5,184,389

[45] Date of Patent: Feb. 9, 1993

[54] GYRATORY MANTLE LINER ASSEMBLY

[75] Inventor: Lance Dean, Elko, Nev.

[73] Assignee: Newmont Gold Company, Carlin, Nev.

[21] Appl. No.: 754,274

[22] Filed: Aug. 30, 1991

Related U.S. Application Data

[63] Continuation-in-part of Ser. No. 579,557, Sep. 11, 1990, Pat. No. 5,080,294.

[51] Int. Cl.[5] ............ B32Q 3/00

[52] U.S. Cl. ............ 29/467; 29/525; 29/525.1

[58] Field of Search ............ 29/467, 525, 525.1; 241/207-216, 294, 300

[56] References Cited

U.S. PATENT DOCUMENTS 251,040 12/1881 Gates ............ 241/294
2,828,925 4/1958 Rumpel ............ 241/300 X
2,974,889 3/1961 Anderson et al. ............ 241/300 X
4,886,218 12/1989 Bradley et al. ............ 241/300 X
5,080,294 1/1992 Dean ............ 241/207 X

*Primary Examiner*—Timothy V. Eley
*Attorney, Agent, or Firm*—Fred A. Keire; William J. Spatz

[57] ABSTRACT

A gyratory mantle liner assembly for use in a gyratory crushing machine including a mainshaft to which is attached a retaining ring having a lip, a conical-shaped upper liner having a serrated and bevelled lower edge, a plurality of lower liner segments and having an upper bevelled edge arranged around the lower circumference of the mainshaft, and a retaining nut for tightening and applying constant force to the upper and lower liner segments to hold them securely against the mainshaft. The lower liner segments defining the crushing surface are generally made of heat treated alloy material.

3 Claims, 5 Drawing Sheets

GYRATORY MANTLE LINER ASSEMBLY

BACKGROUND OF THE INVENTION

This application is a continuation-in-part of application Ser. No. 579,557 filed on Sept. 11, 1990 now U.S. Pat. No. 5,080,294.

FIELD OF THE INVENTION

This invention relates to a liner assembly for rock crushers. Particularly, the invention relates to the multi-sectional mantle liner in a gyratory type crusher. More particularly, this invention relates to gyratory crusher which has sections of liner of different performance characteristics making the liner especially wear resistent, easily replaceable and of outstanding overall performance.

DESCRIPTION OF THE PRIOR ART

Gyratory type crushers are used in the mining industry for reducing ore to a predetermined size for further processing. The development of improved supports and drive mechanisms has allowed gyratory crushers to take over most large hard-ore and mineral-crushing applications and has made these an integral part of the mining industry. Typically, a gyratory crusher comprises a stationary conical bowl or mortar which opens upwardly and has an annular opening in its top to receive feed material. A conical mantle or pestle opening downwardly is disposed within the center of the larger bowl which is eccentrically oscillated for gyratory crushing movement with respect to the bowl. The conical angles of the mantle and bowl are such that the width of the passage decreases toward the bottom of the working faces and may be adjusted to define the smallest diameter of product ore. The oscillatory motion causes impact with some attrition as a piece of ore is caught between the working faces of the bowl and mantle. Furthermore, each bowl and mantle includes a liner assembly replaceably mounted on the working faces, and these liners define the actual crushing surface.

A substantial amount of prior art exists relating to gyratory mantle lining assemblies, however, none of it discloses the present invention or its advantages.

For example, U.S. Pat. No. 3,850,376 relates to a mantle for a gyratory crusher whereby the mantle lining has a concentric groove which permits the mantle lining to flow into this groove when crushing ore thereby reducing the bulging of the liner.

U.S. Pat. No. 3,834,633 relates to a mantle lining assembly for a gyratory crusher having a plurality of arcuate segments, arranged in a ring fashion on the backing plate, and secured thereto with a resilient adhesive such as polyurethane.

U.S. Pat. No. 3,406,917 and U.S. Pat. Reissue No. 26,923 relates to a lining ring assembly for gyratory type crushers having a plurality of segmented members which fit together with one another on the mounting ring to provide the desired grinding surface.

U.S. Pat. No. 3,064,909 relates to a protective ring for the locking nut which retains the mantle element on the central shaft assembly of the gyratory type crusher.

U.S. Pat. No. 2,913,189 relates to a mantle design for a gyratory crusher whereby the process of zincing is simplified. This zincing process, in conjunction with a liner backing design, is intended to keep the mantle and liner tightly mounted as a single unit.

U.S. Pat. No. 1,423,792 relates to a mantle lining assembly for a gyratory crusher whereby the upper and lower mantle sections are held together by locking keys.

U.S. Pat. No. 1,154,100 relates to a mantle lining assembly for a gyratory crusher whereby the upper and lower mantle sections are locked together by an interlock design of the same.

U.S. Pat. No. 1,151,199 relates to a mantle assembly for a gyratory type crusher whereby the upper and lower mantle sections are locked together by a helical end surface design of the same.

U.S. Pat. No. 1,066,277 relates to a mantle assembly for a gyratory type crusher whereby the upper and lower mantle sections are locked together by an S-shaped end surface design of the same.

By far, the largest operating expense for a gyratory crusher unit is associating with relining. It is standard practice for the liner of a gyratory crusher mantle to be of one basic shape and of one type of material, as shown in FIG. 2 herein, illustrating the prior art. The crusher mantle assembly is a conical-shaped mainshaft with upper and lower bearing surfaces, and a mantle liner piece secured by a retaining nut. The liner of the mantle is a metal sleeve or outer-skin which is replaceable. Typically, the liner has a fundamental shape of a hollow frusto-conical section opening downwardly which fits over the conical shaped mainshaft. In order to secure the liner to the mantle, a retaining nut forces the liner downward onto the mantle thereby preventing axial movement of the liner relative to the mantle. The preferred lining material which is generally used is manganese steel which is soft until it becomes work-hardened. The work-hardening process occurs during the act of rock crushing which may develop a surface hardness up to approximately 600 Brinell Hardness Number.

However, single liners have several disadvantages, principally, their large size makes them extremely costly per ton of ore crushed. A further component of the cost is in the changing of the conical liner. It is labor-intensive to change a single mantle liner because the mainshaft must be completely removed from the gyratory crusher before a worn liner can be changed. As a consequence, in continuous ore crushing operations where machine down-time is critical, changing the liner can be very costly.

Another disadvantage of the single liner is the problem of improper wear-in or work-hardening. This problem exists because different ore types do not properly work-harden a manganese steel liner to high surface hardness thereby resulting in less than optimum wear life, and increased crushing cost.

In an attempt to overcome the problems of these increased production costs and the problems of rapid liner wear associated with single mantle liners of the prior art, multi-sectional liners have been proposed. The prior art principally sought to overcome the manufacturing costs of construction by reducing the size of each liner section. Typically, the area of greatest stress in a gyratory crusher, or the area for the half of the liner. It is here that the mantle is subjected to the hardest crushing work and, thus, the greatest wear. Accordingly, as shown in FIG. 3 herein, illustrating another approach by the prior art, multi-sectional liners were developed so that only the worn lower half would need replacement, thereby reducing costs.

In the prior art, different materials have been proposed to solve the problem of this inadequate work-hardening of a liner by using hard metal alloys such as either martensitic white iron or martensitic steel. Metal alloy material which are ideal from the standpoint of abrasion resistance, however, are difficult to use and manufacture. These alloys are more brittle and undergo significant dimensional change as these are heat treated during manufacture. Furthermore, an inherent risk in using large conical heat-treated alloy liners in ore crushing operations is in the risk of catastrophic failure which is caused by the brittle and crack-sensitive nature of these alloys. Unlike the concave liners of the bowl which are held in place by the geometry of their arched structure, the mantle liners are free to fall off once cracking is initiated thereby jamming the gyratory crusher.

The need to secure each liner to the mantle core in order to prevent the movement of the liner is a disadvantage of known multi-sectional mantle liner assemblies. The prior art principally sought to overcome these problems through the process of zincing, which involves pouring molten zinc into channels or grooves on the posterior surface of the mantle liner, thereby securing the liner to the mainshaft. Although zinc has historically been used as a liner locking device that often is no longer the case. More recently NORDBACK TM type plastic compounds have been used as backing material. Once a liner is in place, the poured NORDBACK TM fills in all voids and provides a close form-fitting backing. These compounds serve two purposes: a) providing a close tolerance backing to prevent a liner from "rattling" and experiencing deformations; and b) serving as a barrier between the liner(s) and mainshaft which protects the expensive mainshaft dimensions from being eroded due to many minute liner movements during its useful life.

Another method for securing the liner sections to the mantle core is by way of a series of slots for insertion of a steel bar. The bar joins and locks the sections and, further, prevents axial movement of the mantle liner relative to the mantle core. Still another proposed method to interlock the liner sections is to have an interlocking posterior surface design and to use zincing to secure the same to the mantle core. However, this additional step of securing the liner to the mantle core requires additional time and increases labor costs for removal and affixing of the liner.

In general, the known multi-sectional liners reduce the construction costs of each liner section and, also, extend the usable life of the upper liner. However, the entire mainshaft still has to be removed and disassembled in order to replace a worn lower lining section. Therefore, the cost associated with removing and replacing the entire mantle core and the problems of affixation to prevent the axial movement of the sections still remain.

Another disadvantage of known mantle liner assemblies is that some liners must be machined to fit with certain mantle assembly parts. Such fitting requires that a close tolerance is machined into the liner to insure proper spacing for the above mentioned zincing and other attachments. Although some conventional liners have consisted of a support plate which can be made of mild steel thus increasing the ease of machining, the problems associated with this manufacturing step have still persisted. Furthermore, in the prior art, in liner assemblies where the support plate directly engages the mantle core having a wear surface (e.g., manganese steel) affixed thereto, machining of the support plate is needed for a proper fit and, as a result, increases labor and thus cost of the liner manufacture. Finally, in order to provide an effective fit between the support plate and a liner wear surface, an additional machining step may be needed.

Still further, it has been proposed in the prior art to use multi-sectional mantle liners comprised of numerous liner plates of highly abrasive resistant material arranged concentrically around the mantle forming a conical shaped surface. In this manner, the entire mantle liner is formed of these liner plates. However, these multi-sectional mantle liner plate assemblies must be constructed with an interlocking mantle-liner design, which provides the interlocking of a liner with the mantle core or an adjacent liner plate or even a wear-ring. These limitations decrease the shapes and materials from which the liner plates can be made and, further, increase the costs of construction and maintenance.

Yet another disadvantage of known multi-sectional mantle liner plate assemblies is the need to back each liner plate to the mantle by the conventional zincing processes. Even though these liner plate assemblies of the prior art reduce the labor costs to change the liner, the additional steps of securing each liner plate to the mantle core or to an adjacent liner or even a wear-ring have not eliminated the time or reduced the cost needed for affixation and removal of the liner. Therefore, the shortcomings associated with the step needed to adhere a number of liner plates to the core remain to increase the time and labor involved in replacing a multi-sectional mantle liner plate.

BRIEF DESCRIPTION OF THE INVENTION

The present invention provides a new and improved mantle liner assembly which combines single conical upper mantle liner with a lower mantle liner assembly which is composed of a number of lower mantle liner segments made from wear resistent material. These lower liner segments may, in one embodiment, be positioned without the need for backing adhesives for securing these liner segments to the mantle core. This combination provides for a more durable lining assembly in which individual worn lower liner segments may be removed from the mantle core or mainshaft assembly without a complete removal of the mainshaft. This ability to remove individual liner segments has the advantages of increasing ore crushing production time and decreasing the costs of the associated labor and machine downtime needed to change a worn lower liner segment. Furthermore, this combination provides for a multiple liner assembly wherein more wear-resistant materials may be used for the lower liner segments reducing the problems of improper work hardening and increasing the durability of the same.

The present invention also provides a gyratory mantle liner assembly in which individual lower liner segments are accurately mass-produced by standard foundry practice without the added machining step which is needed to form interlocking surfaces. Several advantages are provided such as the unlimited possibilities for variation of the linear profile depending on the specific needs of each crushing operation. Another advantage is in using different alloys or metallurgical processes, such as heat treatment, for manufacture depending on the specific purpose of the ore crushing operation and ore type.

Furthermore, the present invention provides a multi-sectional liner assembly with an interlocking geometric design of the upper and lower liner sections which reduces the possibility that the lower liner segments, even if worn or cracked, will fall away from the mainshaft assembly.

Still further, the present invention provides a multi-sectional liner assembly with the further advantage of reducing the steps needed to change a worn lower liner section, thereby further reducing crusher operating costs.

Additionally, the present invention provides for a simplified liner design for a multi-sectional liner assembly.

Other features, benefits, and advantages according to the present invention will become apparent from the following detailed description of an illustrated embodiment shown in the accompanying drawings.

FIGS. *6a* and *6b* are schematic views of an interlocking design of an alternative embodiment of the present invention.

DETAILED DESCRIPTION OF THE DRAWINGS AND DESCRIPTION EMBODIMENT OF THE PRESENT INVENTION

Figure 1:
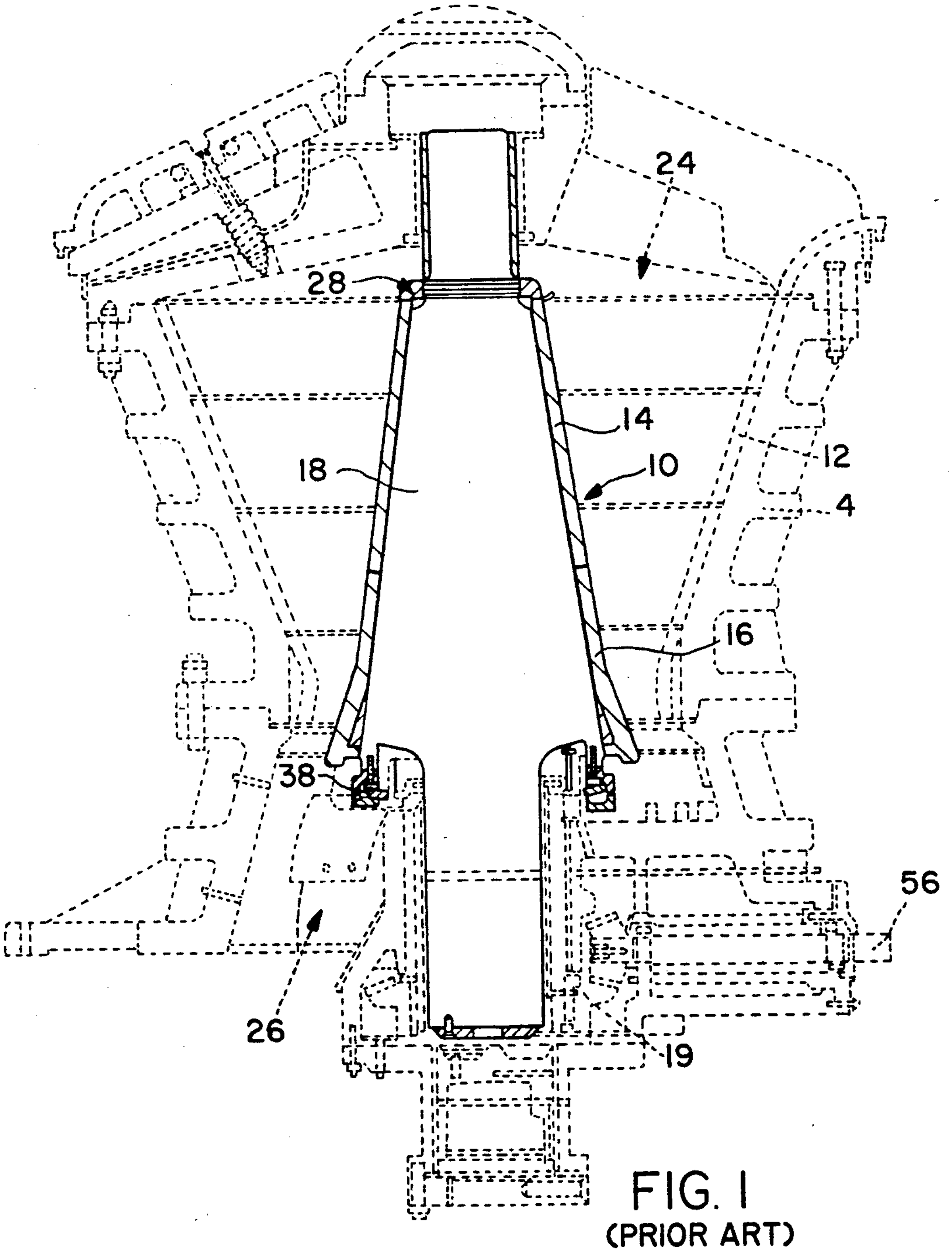
FIG. 1 (PRIOR ART)
FIG. 1, is a partial front-end cross-sectional view of a conventional primary gyratory rock crusher.
Figure 3:
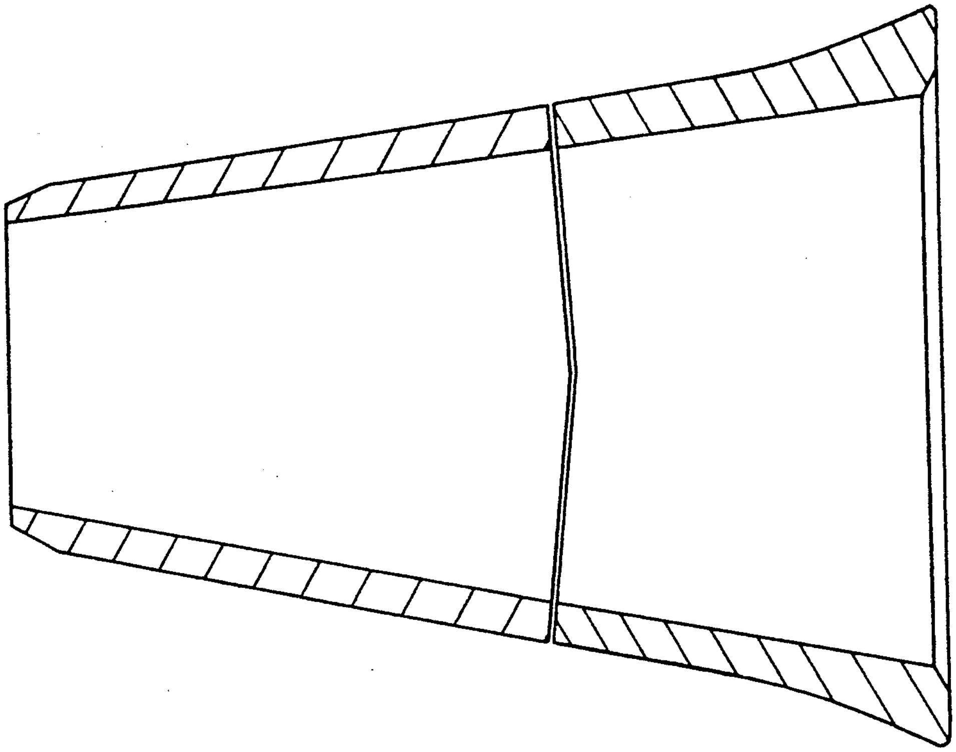
FIG. 3 (PRIOR ART)
FIG. 3, is a schematic cross-sectional view of a two-piece liner showing the upper and lower sections for a gyratory crusher mantle according to the prior art.
Figure 2:
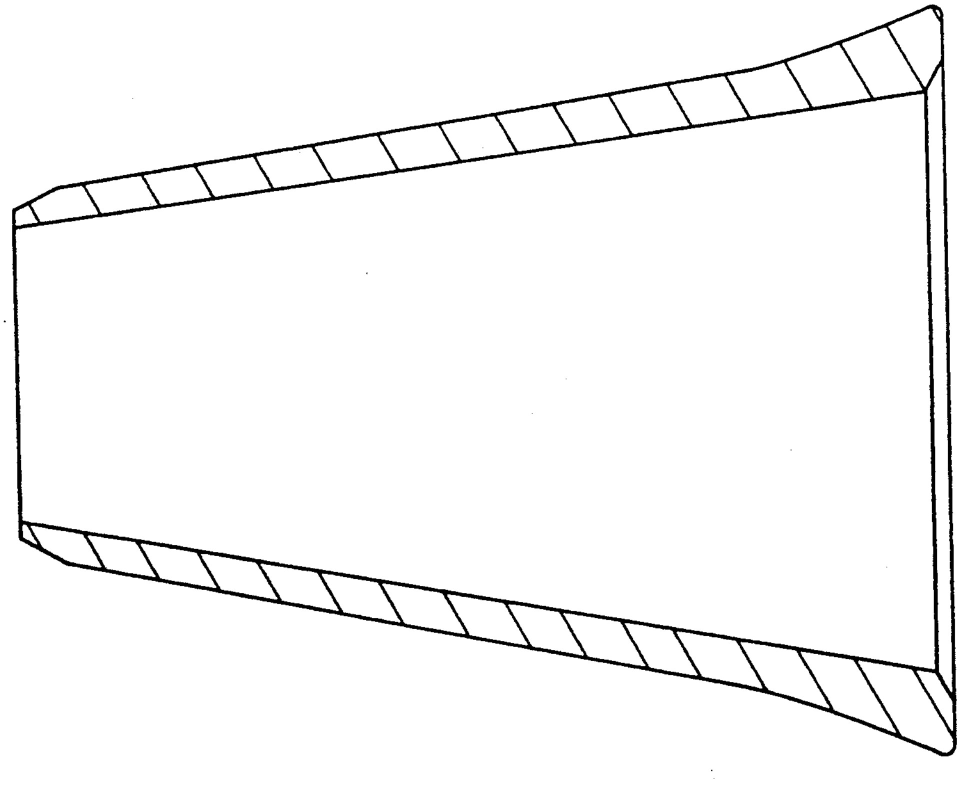
FIG. 2 (PRIOR ART)
FIG. 2, is a schematic cross-sectional view of a standard one-piece liner for a gyratory crusher mantle of the prior art.

The present invention provides an improved mantle liner for a gyratory crusher. Referring to FIG. 1, the gyratory crusher and mantle liner is shown generally at 1 and further assembly for a gyratory crusher is shown in cross-sectional view on the right and in partial front view on the left thereof.

Crushers generally consist of a shell 4 which is lined with wearable material forming a bowl or concave liner assembly 12. A mainshaft 18 has a crushing head or mantle liner assembly shown generally as 10, comprised of an upper liner section 14 and a lower liner section shown generally as 16, both made of wearable material, a lower retaining ring 30, and a head nut or retaining nut 28.

The mainshaft 18 rests on bearing plates within the base of the gyratory crusher. The mainshaft 18 is caused to gyrate by a lower eccentric member 19 which is driven by a pinion 56 to effect gyrating movement of the mantle liner assembly 10 with respect to the bowl liner assembly 12.

Figure 4:
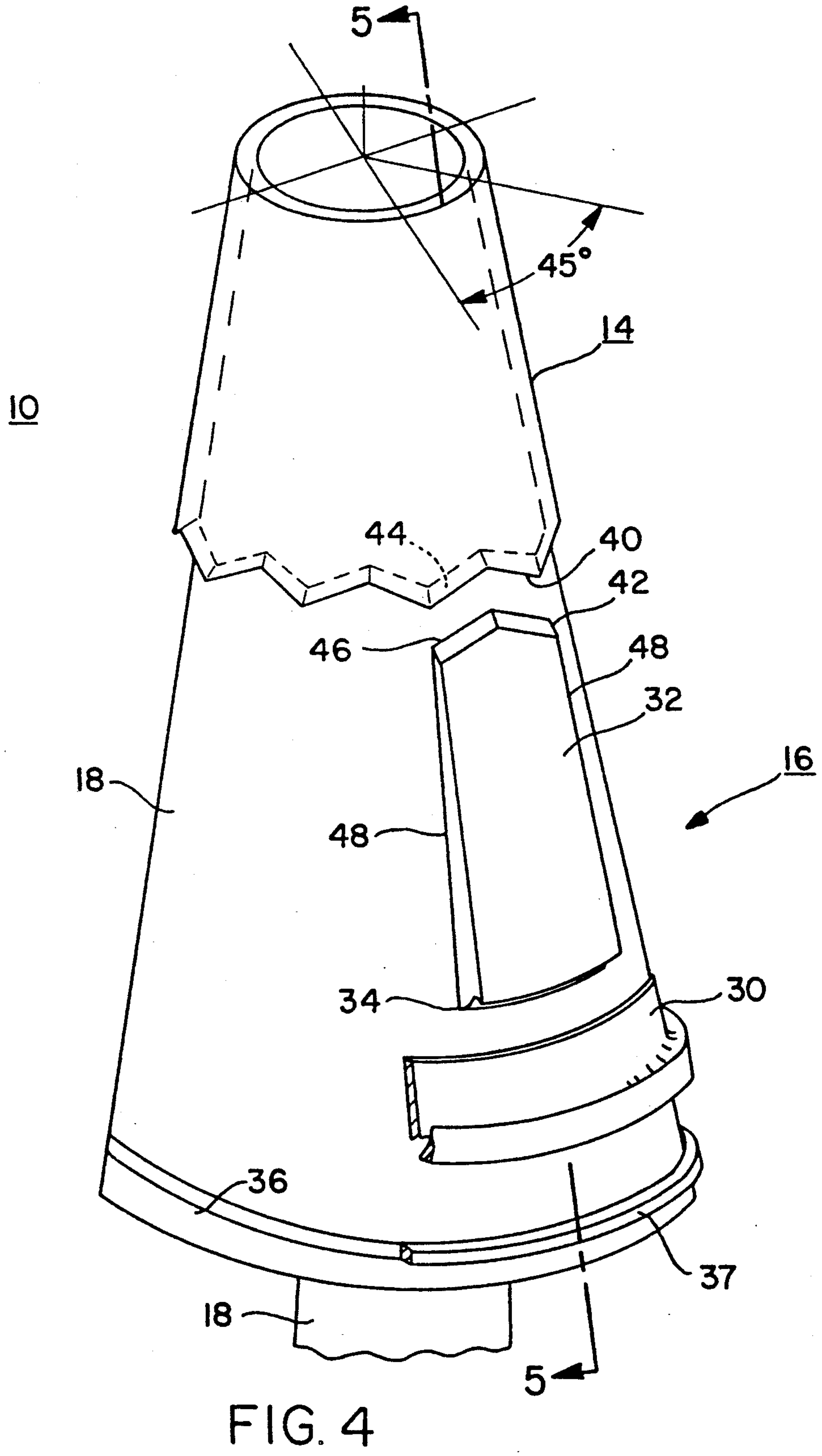
FIG. 4, is a schematic partially orthogonal view of the liner assembly for a gyratory crusher mantle according to an embodiment of the present invention.

The mantle liner assembly 10 is comprised of two sections: an upper liner section 14 and a lower liner section 16 which is formed from a plurality of lower liner segments 32, as further shown in FIG. 4. Each liner of the bowl liner assembly 12 and mantle liner assembly 10 are removable to permit periodic replacement after these become worn.

As seen in FIG. 1, the ore to be processed is fed through a feed inlet 24 at the top of the gyratory crusher and, typically, would first contact upper liner section 14 and progressively move down past the lower liner section 16 as ore is being crushed. The gyratory movement of the rock crusher progressively crushes the rocks between the mantle liner assembly 10 and the bowl liner assembly 12 by the oscillatory movement generated by the eccentric gear 19 imparted to the mainshaft 18. The rocks are thereby reduced in size to be subsequently dropped from the bowl and mantle liner assemblies 12 and 10 through product outlet 26 for further processing.

Figure 5:
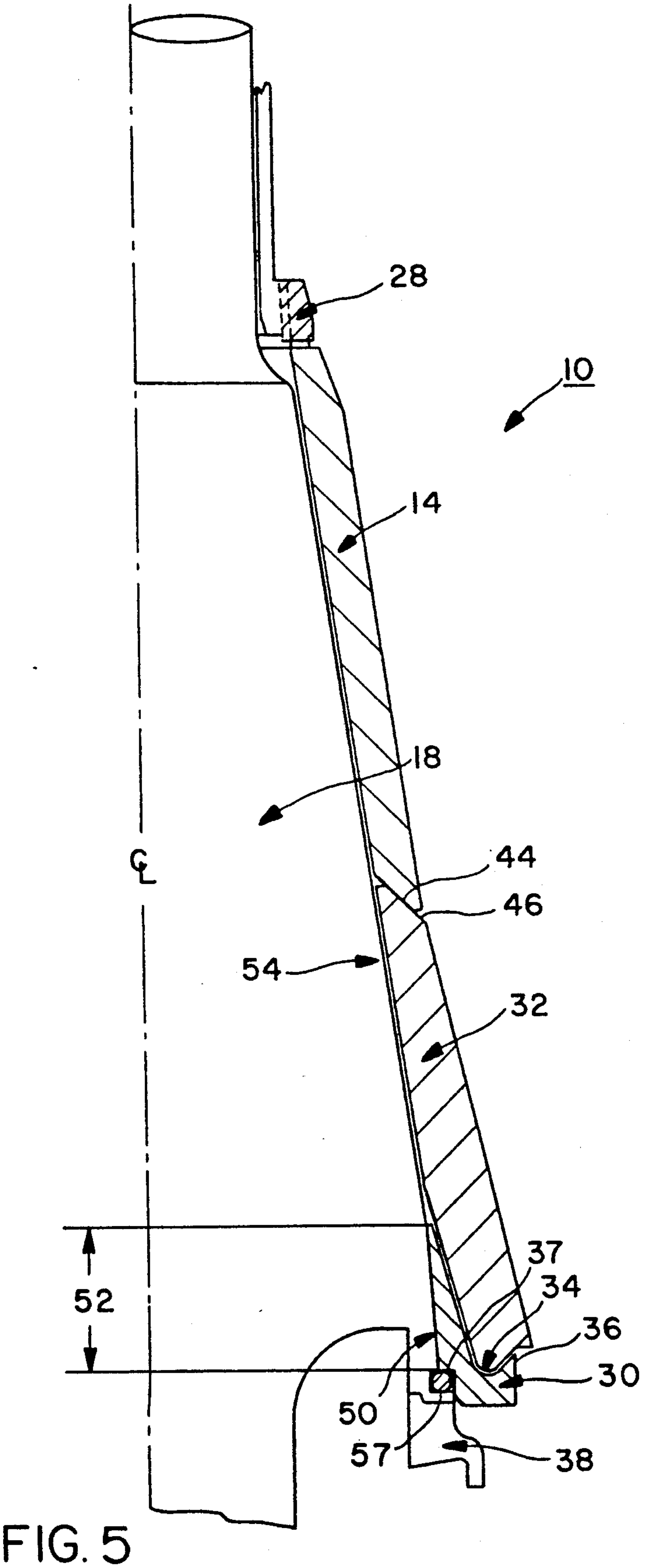
FIG. 5, taken along the lines 5—5 in FIG. 4, is a cross-sectional view of the mantle liner assembly of an embodiment of the present invention.
Figure 6A:
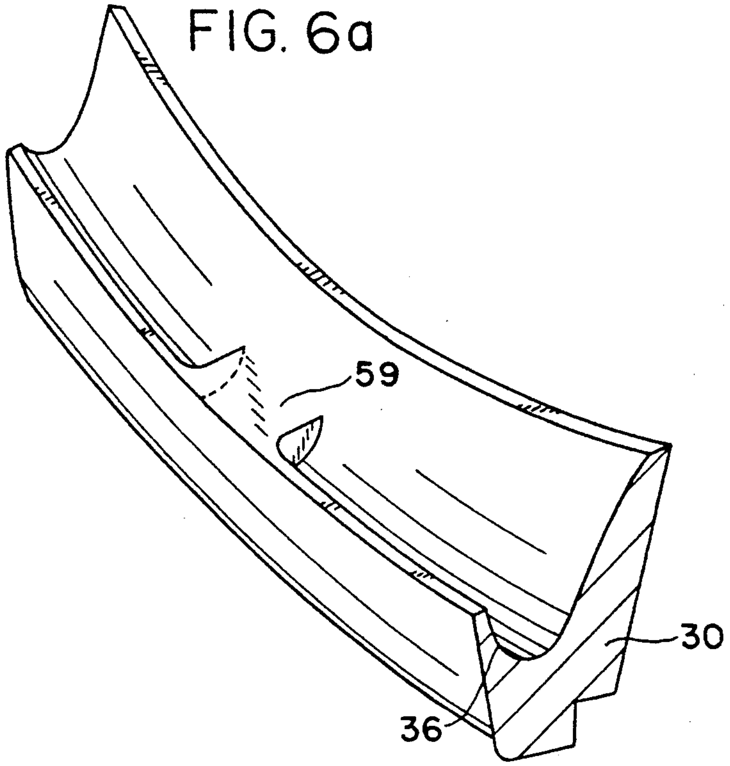
Figure 6B:
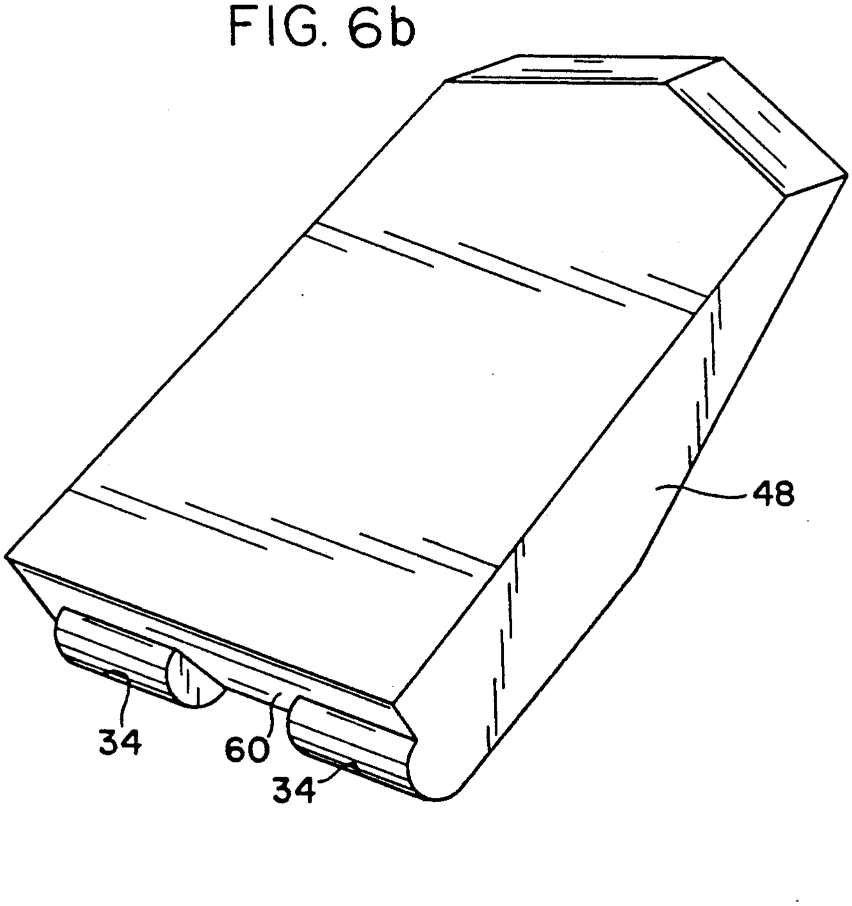

A perspective view of a gyratory mantle liner assembly according to an embodiment of the present invention is shown in FIGS. 4 and 5. FIG. 4 depicts a mainshaft 18 on which a replaceable lower retaining ring 30 is affixed. The mantle liner assembly 10 is comprised of a conical shaped upper liner section 14 and a lower liner section 16. The lower liner segments 32 form a conical surface defining the lower liner section 16.

The frusto-conical section represented by upper liner section 14 opens downwardly and has arcuate teeth or notches 40 extending around the circumference. In a preferred embodiment, the lower liner section 16 is comprised of eight lower liner segments 32 arranged circumferentially around mainshaft 18. Each of the lower liner segments 32 has downwardly tapered side-ends 48, a lower-end surface defining a seat 34 and an upper-end surface 42 having bevelled tooth end 46. In other embodiments the upper liner section 14 and the lower liner section 16 may have from 6 to 10 segments.

In FIG. 5, the mantle core or liner assembly 10 comprises the lower retaining ring 30 having a lip 36 being affixed to the mainshaft by means of a groove 57 and snap ring 37 to area 52 to ensure accurate axial location. The mainshaft 18 further has a dust seal assembly 38 which limits and protects the gear and drive assemblies from the contamination by the dust or rocks generated by the crushing of ore. The upper liner section 14 and the multiple lower liner segments 32 are urged together by retaining nut 28 interdigitating each bevelled notched end 44 and each bevelled tooth end 46 of the arcuate teeth or notches 40 with the arcuate end tooth 42, respectively, and further forcing the seat 34 against the lip 36.

Referring to FIG. 5, the lower retaining ring 30 may be made from high tensile strength steel, e.g., heat treated alloy steel. Due to cost considerations, the more preferred material for the lower retaining ring is mild steel alloy. The lower retaining ring 30 has a lip 36 which accepts the seat 34 of a lower liner segment 32 and supports the same. Moreover, the lower retaining ring 30 is semi-permanently affixed to the lower bell skirt area 52 by means of a snap ring 37. The retaining ring backing surface 50 may be formed by machining a conic surface thereto so that it conforms to the surface angle of the mainshaft 18. Furthermore, one may heat the lower retaining ring 30 to make it expand, place it onto mainshaft 18, so that as it cools, the contraction more permanently secures the lower retaining ring 30 thereon.

In an alternate embodiment of the present invention, referring now to FIGS. *6a* and *6b*, the lower retaining ring 30 having a lip 36 may include further a raised portion 59 defining a lock. Lower liner segments 32 may have voids 60 in the seat portion 34 for interlocking with the conical lip 36 and for accepting the raised portion or lock 59, of the retaining ring 30.

Referring again to FIGS. 4 and 5, the upper liner section 14 is conically shaped opening downwardly and has concentric arcuate teeth 40 having bevelled ends 44. The upper liner section 14 is made from a softer material than the lower liners segments, e.g., manganese steel. The bevelled end 44 of teeth 40 may be manufactured by a conventional method, e.g., by standard foundry practices, when making or casting the upper liner sections and no machining of these bevelled surfaces is required. Furthermore, by using the method of the present invention, the usable life of the upper liner section 14 may be extended from two to five times longer than a single liner of the prior art.

Referring to FIG. 4, each lower liner segment 32 has a seat 34 on the lower-end surface, side-ends 48 downwardly tapered, and arcuate tooth 42 having a bevelled tooth end 46. The lower liner segment 32 has a backing surface 54, shown in FIG. 5, which forms an integral fit between each of the lower liner segments 32 and the mainshaft 18. Each of the lower liner segments 32 is made from highly wear resistent material, e.g., heat treated metal alloys. Because of this unique interlocking structure, no adhesives are needed to secure the backing surface 54 of a lower liner segment 32 to the mainshaft 18, as discussed in more detail below.

The mantle liner assembly 10 is held together by, among other things, a retaining nut 28 threaded on mainshaft 18. Each of the lower liner segments 32 is held against the mainshaft 18 by the combination of the inward force generated by the bevelled edges of the bevelled end 44 and tooth end 46, and the downward force exerted by the retaining nut 28 against the upper liner 14, lower liner segment 32, and lower retaining ring 30. More specifically, the retaining nut 28 provides a downward pressure, forcing the upper liner section 14 and the lower liner section 16 (made up of lower liner segments 32) together, interdigitating the same between the stationary lower retaining ring 30 and the retaining nut 28.

The arcuate interface formed by the interdigitization of arcuate notches 40 and each arcuate end tooth is unique. The bevelled tooth end 46 and the bevelled notched end 44 interlock when the retaining nut 28 is tightened in such a way as to force the backing surface 54 of lower liner segments 32 against the mainshaft 18. The bevelled notched end 44 of arcuate notches 40 positions both vertically and laterally the lower liner segment 32 insuring both the accurate and vertical placement thereof. These forces are great enough so that no adhesives or zincing processes are needed to adhere the backing surface 54 of a lower liner segment 32 to the mainshaft 18 to prevent lateral or axial movement of the lower liner segments 32. The downward tightening of the retaining nut 28 also exerts a downward or vertical force, centered at the inverted-V formed by the arcuate notch 40 and the arcuate tooth 42 but applied uniformly along the entire upper-end surface of arcuate end tooth 42.

The downward force is equal and opposite between the retaining nut 28 and the lower retaining ring 30 (the last being semi-permanently affixed). Tightening the retaining nut also creates an inward force at the interface of the bevelled notched end 44 and the bevelled tooth end 46 due to the bevelled angle of the respective surfaces. Thus, applying a downward force upon arcuate end tooth 42 at the interface of the bevelled notched end 44 and bevelled tooth end 46 results in a highly secure attachment of the liner to the mainshaft.

The upper liner section 14, made of a softer steel, i.e., manganese steel, will have a wear-in or work-hardening period of a sufficient duration to harden the crushing surface of the upper liner section 14. During this period of time, the interdigitating interface between the arcuate notches 40 and arcuate tooth 42 will work harden surface 44 forming a still greater wear resistance to further extend the life of upper liner section 14.

The upper liner section 14 and lower liner section 16 formed of lower liner segments 32 may be made in varying length proportions as required, depending upon the needs of particular ore crushing applications.

The mantle liner assembly 10 may be easily assembled and disassembled. In assembling the mantle liner assembly 10 having the lower retaining ring 30 semi-permanently affixed, each lower liner segment 32 is arranged around the lower retaining ring 30 by placing each seat 34 of each lower liner segment 32 into the lip 36. Each lower liner segment 32 thus placed may then rest against the downwardly tapered conical surface of the mainshaft 18 forming the surface of the lower liner section 16. The upper liner section 14 is then placed over the mainshaft 18 interdigitating the surfaces of the bevelled notched end 44 and tooth end 46 of the upper and lower liner sections 14 and 16, respectively. The retaining nut 28 is placed onto the mainshaft 18 and tightened which forces each arcuate notch 40 and tooth 42 against each other forming a seal thereto. The seal vertically holds the upper and lower liner sections 14 and 16, respectively, in position as well as axially positions and holds the entire mantle liner assembly 10.

In assembling the mantle liner assembly 10, only three steps are required: arrangement of the lower liner segments 32 forming the lower liner section 16, placement of the upper liner section 14 onto mainshaft 18, and tightening retaining nut 28. Disassembly requires the above steps in reverse order.

The replacement of an individual worn or broken lower liner segment 32 is simplified in the present invention. Furthermore, the entire mainshaft 18 and mantle liner assembly 10 does not need to be entirely removed to replace worn lower liner segments 32. In replacing worn liner segments 32, retaining nut 28 is loosened, upper liner section 14 is raised and held in place, each of the individual worn lower liner segments 32 are removed and replaced, upper liner section 14 is lowered over mainshaft 18, and retaining nut 28 is tightened. The procedure is further simplified in that the tapered side-ends 48 of each lower liner segment 32 do not have to be attached. Furthermore, the step of adhering each lower liner segment 32 to the mainshaft with adhesive or zincing may not need to be performed. The mainshaft 18 is then repositioned and crushing continued, thereby saving time and labor resulting in reduced costs.

Although a preferred embodiment of the present invention has been described in detail herein, it is to be understood that this invention is not limited to that precise embodiment, and that many modifications and variations may be effected by one skilled in the art without departing from the invention as defined by the appended claims.

I claim:

1. A method of assembly of a mantle liner for a gyratory crusher comprising:

arranging circumferentially a plurality of lower mantle liner segments in an annular support connected to a mainshaft, each having a top end and a bottom end, the top end being narrower in width than the bottom end;

lowering a frusto-conical upper mantle liner over the mainshaft so that a lower edge of said frustro-conical upper mantle liner interlocks with the upper edge created by the arrangement of the lower mantle liner segments; and applying constant force downward on the upper mantle liner so as to create an equal and opposite force in the annular support.

2. The method as defined in claim 1 wherein said arranging of said lower mantle liner segments includes seating in a lock in said annular support said lower mantle liner segments.

3. The method as defined in claim 1 including locking lower mantle liner segments in said annular support upon applying said constant force downward on said upper mantle liner thereby seating said lower mantle liner segments in said annular support complementary to a void portion in said lower mantle liner segment.

* * * * *